US009796883B2

(12) United States Patent
Katami et al.

(10) Patent No.: US 9,796,883 B2
(45) Date of Patent: Oct. 24, 2017

(54) OPTICAL PRESSURE-SENSITIVE ADHESIVE SHEET, LIQUID CRYSTAL DISPLAY AND INPUT DEVICE COMPRISING THE SAME

(75) Inventors: Hirofumi Katami, Osaka (JP); Tomohide Banba, Osaka (JP); Shou Takarada, Osaka (JP); Masato Fujita, Osaka (JP); Takahiro Nonaka, Osaka (JP); Hiroaki Kishioka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 13/325,684

(22) Filed: Dec. 14, 2011

(65) Prior Publication Data
US 2012/0157611 A1 Jun. 21, 2012

(30) Foreign Application Priority Data

Dec. 15, 2010 (JP) ................... 2010-278847

(51) Int. Cl.
*C09J 133/10* (2006.01)
*C09J 7/00* (2006.01)
(Continued)

(52) U.S. Cl.
CPC ............... *C09J 7/00* (2013.01); *C09J 7/0217* (2013.01); *C09J 133/08* (2013.01);
(Continued)

(58) Field of Classification Search
CPC ...... C09J 7/0207; C09J 7/0217; C09J 7/0235; C09J 7/0246; C09J 133/066; C09J 133/08;
(Continued)

(56) References Cited

U.S. PATENT DOCUMENTS 5,427,851 A * 6/1995 Mehta ........................ 428/356
7,435,779 B2 10/2008 Toyama et al.
(Continued)

FOREIGN PATENT DOCUMENTS

CN 1800288 A 7/2006
CN 101684394 A 3/2010
(Continued)

OTHER PUBLICATIONS

Takada, Masayuki, JP 2007161909 A English Machine Translation by http://www19.ipdl.inpit.go.jp/PA1/result/detail/main/w-Z3pyaDA419161909P1.htm.*
(Continued)

*Primary Examiner* — Eli D Strah
(74) *Attorney, Agent, or Firm* — Sughrue Mion, PLLC (57) ABSTRACT

The present invention provides an excellent optical pressure-sensitive adhesive sheet having an excellent adhesion property to an optical member. The present invention relates to an optical pressure-sensitive adhesive sheet comprising a pressure-sensitive adhesive layer, wherein a relative dielectric constant at a frequency of 1 MHz is 5 to 10, and an adhesion strength to a glass, which is measured with a peel angle of 180° and a tensile speed of 300 mm/min after 30 min of laminating the optical pressure-sensitive adhesive sheet to the glass, is 3 N/20 mm to 15 N/20 mm.

8 Claims, 1 Drawing Sheet (51) Int. Cl.
*C09J 7/02* (2006.01)
*C09J 133/08* (2006.01)
*G02F 1/1333* (2006.01)

(52) U.S. Cl.
CPC .... *G02F 1/13338* (2013.01); *B32B 2457/202* (2013.01); *C08L 2312/06* (2013.01); *C09J 2201/622* (2013.01); *C09J 2203/318* (2013.01); *C09J 2205/31* (2013.01); *C09J 2433/00* (2013.01); *G02F 2202/28* (2013.01); *Y10T 428/1059* (2015.01); *Y10T 428/1077* (2015.01)

(58) Field of Classification Search
CPC .. C09J 133/10; C09J 133/12; C09J 2203/318; C09J 7/00; C09J 2201/622; C09J 2205/31; C09J 2433/00; B32B 27/06; B32B 27/08; B32B 27/30; B32B 27/308; B32B 17/10201; B32B 17/10431; B32B 2307/04; B32B 2457/202; G06F 3/044; C08L 2312/06; G02F 1/13338; G02F 2202/28; Y10T 428/1059; Y10T 428/1077
USPC ........ 428/1.1, 1.3, 1.31, 1.32, 1.33, 1.4, 1.5, 428/1.51, 1.52, 1.53, 1.54, 1.55, 1.6, 1.61, 428/1.62; 427/207.1, 208, 208.4, 208.6, 427/208.8; 156/106; 349/96, 122–138
See application file for complete search history.

(56) References Cited

U.S. PATENT DOCUMENTS

| | | | |
|---|---|---|---|
| 7,825,189 B2 | 11/2010 | Tomita et al. | |
| 7,923,120 B2 | 4/2011 | Toyama et al. | |
| 2003/0232192 A1* | 12/2003 | Kishioka et al. | 428/354 |
| 2006/0121273 A1* | 6/2006 | Toyama et al. | 428/343 |
| 2006/0162857 A1* | 7/2006 | Nagamoto | C09J 133/08 156/272.8 |
| 2009/0022988 A1 | 1/2009 | Toyama et al. | |
| 2009/0068459 A1* | 3/2009 | Kishioka et al. | 428/355 CN |
| 2009/0073351 A1* | 3/2009 | Kakinuma | G02F 1/1334 349/89 |
| 2009/0081469 A1* | 3/2009 | Oka | C08F 2/50 428/441 |
| 2009/0104440 A1* | 4/2009 | Nashiki et al. | 428/336 |
| 2009/0116132 A1* | 5/2009 | Hiwatashi et al. | 359/885 |
| 2009/0270557 A1 | 10/2009 | Tomita et al. | |
| 2010/0080991 A1* | 4/2010 | Kishioka et al. | 428/355 R |
| 2010/0208025 A1 | 8/2010 | Ugajin et al. | |
| 2010/0255253 A1* | 10/2010 | Kishioka | C09J 7/0217 428/141 |
| 2012/0094037 A1* | 4/2012 | Banba et al. | 428/1.5 |
| 2013/0115450 A1 | 5/2013 | Kishioka et al. | |
| 2013/0211028 A1 | 8/2013 | Shinike et al. | |
| 2013/0323437 A1 | 12/2013 | Banba et al. | |

FOREIGN PATENT DOCUMENTS

| | | | | |
|---|---|---|---|---|
| CN | 102803419 A | 11/2012 | | |
| EP | 1 956 064 A1 | 8/2008 | | |
| EP | 1956064 A1 | 8/2008 | | |
| EP | 2169024 A1 | 3/2010 | | |
| JP | 2002-363523 A | 12/2002 | | |
| JP | 2007138056 A | 6/2007 | | |
| JP | 2007161909 A | * | 6/2007 | C09J 4/02 |
| JP | 2007191671 A | 8/2007 | | |
| JP | 2009-79203 A | 4/2009 | | |
| JP | 2009-242786 A | 10/2009 | | |
| JP | 2010053313 A | 3/2010 | | |
| JP | 2010-77287 A | 4/2010 | | |
| JP | 2010184449 A | 8/2010 | | |
| JP | 2010235646 A | 10/2010 | | |
| JP | 2010-254956 A | 11/2010 | | |
| JP | 2012-41456 A | 3/2012 | | |
| TW | 200303911 A | 9/2003 | | |
| TW | 200728423 A | 8/2007 | | |
| WO | 2010/040014 A1 | 4/2010 | | |
| WO | 2010147047 A1 | 12/2010 | | |

OTHER PUBLICATIONS

European Search Report dated Mar. 28, 2012 issued by the European Patent Office in counterpart European Patent Application No. 11193381.8.
Office Action dated Dec. 11, 2013, issued by the State Intellectual Property Office of the P.R.C. in corresponding Chinese Application No. 201110416500.X.
Office Action dated Jun. 12, 2014 issued by the State Intellectual Property Office of the People's Republic of China in counterpart Chinese Patent Application No. 201110416500.X.
Office Action dated Oct. 31, 2014 issued by the State Intellectual Property Office of the People's Republic of China in counterpart Chinese Patent Application No. 201110416500.
Office Action dated May 19, 2015, issued by the Japanese Intellectual Property Office in counterpart Japanese Application No. 2011-265368.
Office Action dated Mar. 25, 2015 issued by the Taiwanese Patent Office in counterpart Taiwanese Patent Application No. 100146623.
Notification of Reasons for Refusal dated Nov. 17, 2015 issued by the Japanese Patent Office in counterpart Japanese Patent Application No. 2011-265368.
Communication issued on Sep. 30, 2015 by the European Patent Office in related Application No. 11193381.8.
Communication issued on Aug. 27, 2015 by the Japanese Patent Office in related Application No. 2011-265368.
Communication issued on Sep. 3, 2015 by the Japanese Patent Office in related Application No. 2011-265368.
Communication issued on Aug. 25, 2015 by The Intellectual Property Office of Taiwan in related Application No. 100146623.
Notification of Reexamination dated Apr. 28, 2016 issued by the State Intellectual Property Office of P.R. China in counterpart Chinese Patent Application No. 201110416500.X.
Extended European Search Report dated Aug. 12, 2016 issued by the European Patent Office in counterpart European Patent Application No. 11 193 381.8.
Notification of Reasons for Refusal issued on May 31, 2016, by the Japanese Patent Office in counterpart Japanese Application No. 2011-265368.

* cited by examiner

OPTICAL PRESSURE-SENSITIVE ADHESIVE SHEET, LIQUID CRYSTAL DISPLAY AND INPUT DEVICE COMPRISING THE SAME

BACKGROUND OF THE INVENTION

Technical Field

The present invention relates to an optical pressure-sensitive adhesive sheet.

Background Art

Recently, display devices such as liquid crystal displays (LCDs) or input devices, such as a touch panel, which is used by combining the display device has been widely used in various fields. In manufacturing the display devices or the input devices, a pressure-sensitive adhesive sheet is used for laminating optical members (see, for example, Patent Document 1).

A touch panel has been considered as a trend of an image display method, and in particular, an electric capacity type touch panel has been widely used. The electric capacity type touch panel has a configuration in which many members are laminated, and a pressure-sensitive adhesive sheet is used for the purpose of laminating the members. An example of the electric capacity type touch panel may include an electric capacity type touch panel having a laminated structure of cover glass/pressure-sensitive adhesive sheet/conductive film such as an indium tin oxide film (ITO film)/glass substrate.

The electric capacity type touch panel has a structure in which, when the touch panel is touched by a finger, the capacitance of the corresponding position is changed, and detection (sensing) is performed when the amount of the capacitance changed exceeds a predetermined critical value. In the touch panel having a laminated structure of cover glass/pressure-sensitive adhesive sheet/conductive film (ITO film)/glass substrate, the capacitance changed by touching the panel with a finger needs to be transmitted to a detection part (sensing part) of the touch panel (T/P). Accordingly, the pressure-sensitive adhesive sheet used in the electric capacity type touch panel needs to have high relative dielectric constant. Meanwhile, if relative dielectric constant of the pressure-sensitive adhesive sheet is too high, noise tends to be easily detected, and in the case where an output signal is changed, the transmission time of a signal tends to be delayed, thereby causing a problem in detection sensitivity (sensing sensitivity).

The pressure-sensitive adhesive sheet used in the electric capacity type touch panel needs to have an excellent adhesion property to members constituting the touch panel. For example, the pressure-sensitive adhesive sheet used in the electric capacity type touch panel having a laminated structure of cover glass/pressure-sensitive adhesive sheet/conductive film (ITO film)/glass substrate needs to have an excellent adhesion property, particularly, to a cover glass.

Patent Document 1: JP 2002-363523 A

SUMMARY OF THE INVENTION

The present invention has been made in an effort to provide an excellent optical pressure-sensitive adhesive sheet having an excellent adhesion property to an optical member. Particularly, the present invention provides an optical pressure-sensitive adhesive sheet that, when the optical pressure-sensitive adhesive sheet is used in laminating members constituting the electric capacity type touch panel, exhibits an excellent adhesion property to the members constituting the touch panel, and does not negatively affect the performance of the touch panel such as a detection sensitivity or a response speed.

The present inventors have intensively studied in order to solve the problems. As a result, the inventors have found out that an excellent optical pressure-sensitive adhesive sheet exhibiting an excellent adhesion property to optical members can be obtained by setting relative dielectric constant at a frequency of 1 MHz and adhesion force to glass within a specific range. Particularly, the present inventors have found out an excellent optical pressure-sensitive adhesive sheet that, when the optical pressure-sensitive adhesive sheet is used in laminating members constituting the electric capacity type touch panel, exhibits an excellent adhesion property to members constituting the touch panel, and does not negatively affect the performance of the touch panel such as a detection sensitivity or a response speed, thereby completing the present invention.

That is, the optical pressure-sensitive adhesive sheet of the present invention comprises a pressure-sensitive adhesive layer, wherein a relative dielectric constant at a frequency of 1 MHz is 5 to 10, and an adhesion strength to a glass, which is measured with a peel angle of 180° and a tensile speed of 300 mm/min after 30 min of laminating the optical pressure-sensitive adhesive sheet to the glass, is 3 N/20 mm to 15 N/20 mm.

In the optical pressure-sensitive adhesive sheet of the present invention, the pressure-sensitive adhesive layer preferably comprises an acrylic pressure-sensitive adhesive layer.

In the optical pressure-sensitive adhesive sheet of the present invention, the acrylic pressure-sensitive adhesive layer preferably comprises, as a base polymer, an acrylic polymer formed from a component comprising, as an essential monomer component, alkyl ester(meth)acrylate having a straight-chain or branched alkyl group having 1 to 14 carbon atoms and/or alkoxyalkyl ester(meth)acrylate.

In the optical pressure-sensitive adhesive sheet of the present invention, the acrylic polymer is preferably formed by an active-energy-ray polymerization with an irradiation of an active-energy-ray.

In the optical pressure-sensitive adhesive sheet of the present invention, the pressure-sensitive adhesive layer preferably comprises a silane coupling agent.

In the optical pressure-sensitive adhesive sheet of the present invention, a total light transmittance is preferably 90% or more and a haze is preferably 3.0% or less.

The optical pressure-sensitive adhesive sheet of the present invention is preferably used for laminating to a member contained in a touch panel.

In the optical pressure-sensitive adhesive sheet of the present invention, the touch panel is preferably an electric capacity type touch panel.

In addition, in a liquid crystal display device or an input device of the present invention comprises the optical pressure-sensitive adhesive sheet.

Since the optical pressure-sensitive adhesive sheet according to the present invention has the above configuration, the optical pressure-sensitive adhesive sheet has an excellent adhesion property to optical members. In particular, when the optical pressure-sensitive adhesive sheet according to the present invention is used for laminating members constituting the electric capacity type touch panel, the optical pressure-sensitive adhesive sheet exhibits an excellent adhesion property to the members constituting the touch panel, and does not negatively affect the performance of the touch panel such as a detection sensitivity or a response speed.

DETAILED DESCRIPTION OF THE INVENTION

Figure 1:
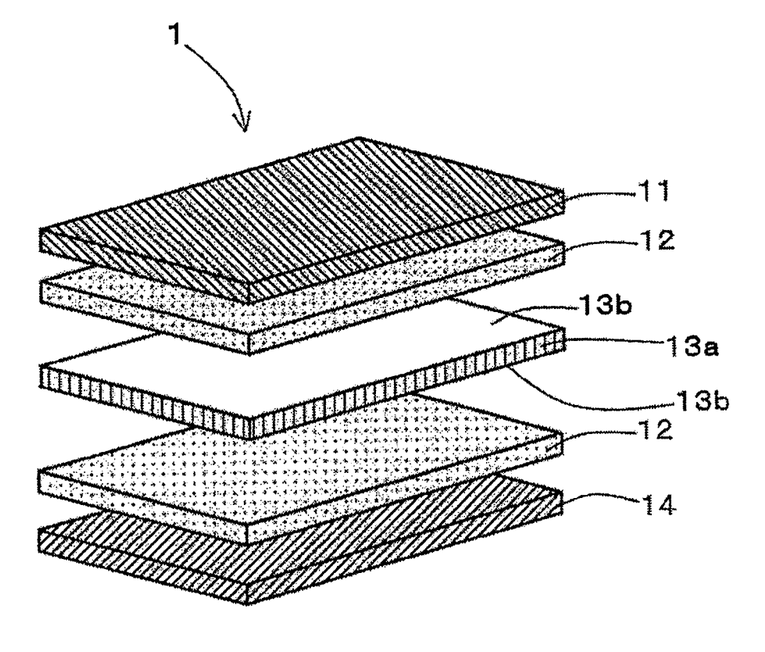
The FIGURE is a schematic view illustrating an embodiment of an electric capacity type touch panel formed by laminating members using an optical pressure-sensitive adhesive sheet according to the present invention.

In the optical pressure-sensitive adhesive sheet according to the present invention, a relative dielectric constant at a frequency of 1 MHz is 5 to 10, and an adhesion strength to glass (which is measured with a release angle of 180° and tensile speed of 300 mm/min after 30 minutes of laminating the pressure-sensitive adhesive sheet to the glass) is 3 N/20 mm to 15 N/20 mm. In the present specification, the "relative dielectric constant at a frequency of 1 MHz" may be simply referred to "relative dielectric constant", and the adhesion strength to glass may be referred to "adhesion force to glass".

The optical pressure-sensitive adhesive sheet according to the present invention has at least a pressure-sensitive adhesive layer and includes any forms such as a tape and a sheet. The pressure-sensitive adhesive sheet according to the present invention may be a substrateless type pressure-sensitive adhesive sheet that does not have substrate (substrate layer), or a pressure-sensitive adhesive sheet with substrate (substrate layer). Particularly, the pressure-sensitive adhesive sheet according to the present invention is preferably a substrateless type pressure-sensitive adhesive sheet formed only with a pressure-sensitive adhesive layer from the standpoint of improving optical properties such as thinning and transparency. The "substrate" does not include a release liner (separator).

The optical pressure-sensitive adhesive sheet according to the present invention may be a single-sided pressure-sensitive adhesive sheet having a pressure-sensitive adhesive property on one side thereof or a double-sided pressure-sensitive adhesive sheet having an pressure-sensitive adhesive property on both sides thereof. The pressure-sensitive adhesive layer providing an pressure-sensitive adhesive surface may be a single layer structure or a laminate structure.

In the optical pressure-sensitive adhesive sheet according to the present invention, a relative dielectric constant at a frequency of 1 MHz is 5 to 10, preferably 5 to 9, and more preferably 5 to 8. If the relative dielectric constant is more than 10 or the relative dielectric constant is less than 5, the optical members to which the pressure-sensitive adhesive sheet is applied, may have damaged functions or characteristics thereof. The relative dielectric constant may be determined according to JIS K 6911.

For example, in the case where the optical pressure-sensitive adhesive sheet according to the present invention is applied to the electric capacity type touch panel, if the relative dielectric constant is less than 5, the capacitance value required for detecting (sensing) the touch panel is decreased, thereby being easily affected by a noise signal, and the ratio of a signal of detection and noise is decreased, thereby easily causing misoperation, which is not preferable. Meanwhile, if the relative dielectric constant is more than 10, the capacitance value becomes too large, thereby easily causing a time delay in signal and decreasing the sensitivity of detection, which is not preferable.

In the optical pressure-sensitive adhesive sheet according to the present invention, the adhesion force to glass is 3 N/20 mm to 15 N/20 mm, preferably 5 N/20 mm to 15 N/20 mm, and more preferably 7 N/20 mm to 15 N/20 mm. When the adhesion force to glass is more than 15 N/20 mm, rework (amendment of position) may not be able to be performed. Meanwhile, when the adhesion force to glass is less than 3 N/20 mm, a problem may occur from the standpoint of adhesion reliability.

The adhesion force to glass may be obtained by laminating the pressure-sensitive adhesive sheet to the glass plate, being left standing them for 30 min, and then releasing the pressure-sensitive adhesive sheet from the glass plate under the environment of 23° C. and 50% RH and under the conditions of a release angle of 180° and a tensile speed of 300 mm/min. In the glass plate, an adherend surface (surface to which the pressure-sensitive adhesive sheet is adhered) is a surface from which fluorescence is not emitted even when irradiating UV having a wavelength of 254 nm by a UV lamp. In the case where the pressure-sensitive adhesive sheet is a double-sided pressure-sensitive adhesive sheet, a backing material (e.g., PET film having a thickness of 25 μm) is limited thereto, and the adhesion force is measured. Examples of the glass plate include particularly a slide glass, and examples of the slide glass include "MATUNAMI MICRO SLIDE GLASS S series, manufactured by Matsunami Glass Ind., Ltd.". The adhesion force to glass means a force when the pressure-sensitive adhesive sheet adhered to the glass plate is released from the glass plate.

In the optical pressure-sensitive adhesive sheet according to the present invention, a total light transmittance (in accordance with JIS K 7361) in a visible light wavelength range is not particularly limited, but is preferably 90% or more (e.g., 90% to 99.9%), and more preferably 91% or more (e.g., 91% to 99.9%). In the pressure-sensitive adhesive sheet according to the present invention, a haze (in accordance with JIS K 7136) is not particularly limited, but is preferably 3.0% or less (e.g., 0.1% to 3.0%), and more preferably 2.0% or less (e.g., 0.1% to 2.0%). This is because that it is preferable that the optical pressure-sensitive adhesive sheet according to the present invention has a high transparency from the standpoint of visibility in the case where the pressure-sensitive adhesive sheet is applied to the optical members, such as a case where the pressure-sensitive adhesive sheet is applied to the electric capacity type touch panel. The total light transmittance and haze can be measured using, for example, a haze meter (trade name of 'HM-150' manufactured by Murakami Color Research Laboratory Co., Ltd.).

(Pressure-Sensitive Adhesive Layer)

The optical pressure-sensitive adhesive sheet according to the present invention has at least a pressure-sensitive adhesive layer. The pressure-sensitive adhesive layer is formed from a pressure-sensitive adhesive composition. As described below, it is preferable that the pressure-sensitive adhesive sheet according to the present invention has an acrylic pressure-sensitive adhesive layer as the pressure-sensitive adhesive layer. Meanwhile, this acrylic pressure-sensitive adhesive layer is formed from an acrylic pressure-sensitive adhesive composition. The "pressure-sensitive adhesive composition" includes both meanings of a "composition for forming the pressure-sensitive adhesive layer" and a "composition for forming the pressure-sensitive adhesive".

The pressure-sensitive adhesive for forming the pressure-sensitive adhesive layer is not particularly limited, and examples thereof include acrylic pressure-sensitive adhesives, rubber-based pressure-sensitive adhesives, vinyl alkyl ether-based pressure-sensitive adhesives, silicone-based pressure-sensitive adhesives, polyester-based pressure-sensitive adhesives, polyamide-based pressure-sensitive adhesives, urethane-based pressure-sensitive adhesives, fluorine-based pressure-sensitive adhesives, epoxy-based pressure-sensitive adhesives and polyether-based pressure-sensitive adhesives. The pressure-sensitive adhesives for forming the pressure-sensitive adhesive layer are used either alone or in combination of two or more thereof.

Acrylic pressure-sensitive adhesives or polyether-based pressure-sensitive adhesives are preferably used as the pressure-sensitive adhesive from the standpoint of transparency, processability, and durability, and the acrylic pressure-sensitive adhesives are more preferably used. Namely, the optical pressure-sensitive adhesive sheet according to the present invention preferably has an acrylic pressure-sensitive adhesive layer or a polyether-based pressure-sensitive adhesive layer, and more preferably has an acrylic pressure-sensitive adhesive layer.

The content of the base polymer in the pressure-sensitive adhesive layer is not particularly limited, but is preferably 60 wt % or more (e.g., 60 wt % to 100 wt %), and more preferably 80 wt % or more (e.g., 80 wt % to 100 wt %) based on the total weight of the pressure-sensitive adhesive layer.

The base polymer is prepared by polymerizing monomer components by a known/general polymerization method. For example, the acrylic polymer that is the base polymer of the acrylic pressure-sensitive adhesive is formed by a polymerization method such as a solution polymerization method, an emulsion polymerization method, a bulk polymerization method and a polymerization method by active-energy-ray irradiation (an active-energy-ray polymerization method or a photopolymerization method).

The polyether-based pressure-sensitive adhesive layer includes a polyether-based polymer as a base polymer. The polyether-based polymer is not particularly limited, and a polyoxyalkylene-based polymer is preferable.

The polyoxyalkylene-based polymer is not particularly limited, and the polyoxyalkylene-based polymer preferably has a repeating unit represented by the following general formula (1) in a main chain of the polymer.

(wherein R¹ is an alkylene group)

In the general formula (1), $R^1$ is preferably a straight-chain or branched alkylene group having 1 to 14 carbon atoms, and more preferably a straight-chain or branched alkylene group having 2 to 4 carbon atoms.

Specific examples of the repeating unit represented by the general formula (1) include —CH$_2$O—, —CH$_2$CH$_2$O—, —CH$_2$CH(CH$_3$)O—, —CH$_2$CH(CH$_2$H$_5$)O—, —CH$_2$C(CH$_3$)$_2$O— and —CH$_2$CH$_2$CH$_2$CH$_2$O—. The backbone of main chains of the polyoxyalkylene-based polymer may consist of only one type of repeating unit or two or more types of repeating units. Particularly, polymers having —CH$_2$CH(CH$_3$)O— as a main repeating unit are preferable from the standpoint of availability and workability. Also, polymers having repeating units other than an oxyalkylene group may be included in the main chain thereof, wherein the sum of oxyalkylene units in the polymer is preferably 80 wt % or more, and more preferably 90 wt % or more, based on the total amount (100 wt %) of the monomer component forming the polymer.

A polyoxyalkylene-based polymer may be a straight-chain polymer, a branched polymer, or a mixture thereof, and the polyoxyalkylene-based polymer may include 50 wt % or more of the straight-chain polymer in order to obtain good pressure-sensitive adhesion.

The acrylic pressure-sensitive adhesive layer contains an acrylic polymer as a base polymer. The acrylic polymer includes an acrylic monomer as an essential monomer component. The acrylic polymer may be a homopolymer of the acrylic monomer, a copolymer of a plurality of acrylic monomers, or a copolymer of the acrylic monomer and monomer other than the acrylic monomer.

The acrylic monomer is preferably alkyl ester(meth)acrylate having a straight-chain or branched alkyl group or alkoxyalkyl ester(meth)acrylate. The term "(meth)acryl" represents "acryl" and/or "methacryl" and the same applies to others.

As the acrylic monomer, alkyl ester(meth)acrylate having a straight-chain or branched alkyl group may be used alone, alkoxyalkyl ester(meth)acrylate may be used alone, or alkyl ester(meth)acrylate having a straight-chain or branched alkyl group and alkoxyalkyl ester(meth)acrylate may be used in combination. In the case where alkyl ester(meth)acrylate having a straight-chain or branched alkyl group and alkoxyalkyl ester(meth)acrylate are used in combination as the acrylic monomer, a content thereof is not particularly limited.

In the optical pressure-sensitive adhesive sheet according to the present invention, alkoxyalkyl ester(meth)acrylate is preferably used as the acrylic monomer from the standpoint of increasing relative dielectric constant while obtaining a desired adhesion force to glass while.

The alkyl ester(meth)acrylate having a straight-chain or branched alkyl group is not particularly limited, and examples thereof include alkyl ester(meth)acrylate of which an alkyl group has 1 to 20 carbon atoms such as methyl (meth)acrylate, ethyl(meth)acrylate, propyl(meth)acrylate, isopropyl(meth)acrylate, butyl(meth)acrylate, isobutyl (meth)acrylate, s-butyl(meth)acrylate, t-butyl(meth)acrylate, pentyl(meth)acrylate, isopentyl(meth)acrylate, hexyl (meth)acrylate, heptyl(meth)acrylate, octyl(meth)acrylate, 2-ethylhexyl(meth)acrylate, isooctyl(meth)acrylate, nonyl (meth)acrylate, isononyl(meth)acrylate, decyl(meth)acrylate, isodecyl(meth)acrylate, undecyl(meth)acrylate, dodecyl(meth)acrylate, tridecyl(meth)acrylate, tetradecyl(meth) acrylate, pentadecyl(meth)acrylate, hexadecyl(meth) acrylate, heptadecyl(meth)acrylate, octadecyl(meth) acrylate, nonadecyl(meth)acrylate, and eicosyl(meth) acrylate. Among alkyl ester(meth)acrylates, alkyl ester (meth)acrylate having the straight-chain or branched alkyl group is preferably alkyl ester(meth)acrylate having a straight-chain or branched alkyl group having 1 to 14 carbon atoms, and more preferably alkyl ester(meth)acrylate having a straight-chain or branched alkyl group having 1 to 10 carbon atoms. The alkyl ester(meth)acrylate having a straight-chain or branched alkyl group may be used either alone or in combination of two or more thereof.

The alkoxyalkyl ester(meth)acrylate is not particularly limited, and examples thereof include 2-methoxyethyl (meth)acrylate, 2-ethoxyethyl(meth)acrylate, methoxytriethyleneglycol(meth)acrylate, 3-methoxypropyl(meth)acrylate, 3-ethoxypropyl(meth)acrylate, 4-methoxybutyl(meth) acrylate and 4-ethoxybutyl(meth)acrylate. Among them, the above alkoxyalkyl ester(meth)acrylate is preferably alkoxyalkyl ester acrylate and more preferably 2-methoxyethyl acrylate (2MEA).

In the acrylic polymer, there is no particular limit to the content of the sum of alkyl ester(meth)acrylate having a straight-chain or branched alkyl group and the alkoxyalkyl ester(meth)acrylate in the total monomer components (100 wt %) forming the acrylic polymer. However, from the standpoint of easily controlling the adhesion property and relative dielectric constant of the pressure-sensitive adhesive sheet, the content is preferably 70 wt % or more (e.g., 70 wt % to 100 wt %) and more preferably 80 wt % or more (e.g., 80 wt % to 100 wt %) based on the total amount of the monomer components (100 wt %) forming the acrylic polymer.

In the case where the alkoxyalkyl ester(meth)acrylate is used as the acrylic monomer, the content of alkoxyalkyl ester(meth)acrylate in the total monomer component (100 wt %) forming the acrylic polymer is preferably 40 wt % or more, and more preferably 50 wt % or more from the standpoint of easily obtaining a pressure-sensitive adhesive sheet having a good adhesion property to optical members and a high relative dielectric constant.

The acrylic polymer may be a copolymer of alkyl ester (meth)acrylate having a straight-chain or branched alkyl group and/or alkoxyalkyl ester(meth)acrylate and a copolymerizable monomer. The copolymerizable monomer is not particularly limited, and examples thereof include polar group-containing monomers, multifunctional monomers and other copolymerizable monomers. The copolymerizable monomers are used either alone or in combination of two or more thereof.

Examples of the polar group-containing monomers include: carboxyl group-containing monomers such as (meth)acrylate, itaconic acid, maleic acid, fumaric acid, crotonic acid and anhydrides thereof (e.g., maleic anhydride); hydroxyl group-containing monomers such as vinyl alcohol, aryl alcohol, and hydroxyalkyl(meth)acrylate such as 2-hydroxyethyl(meth)acrylate, 3-hydroxypropyl(meth) acrylate, 4-hydroxybutyl(meth)acrylate and 6-hydroxyhexyl (meth)acrylate; amide group-containing monomers such as (meth)acrylamide, N,N-dimethyl(meth)acrylamide, N-methylol(meth)acrylamide, N-methoxymethyl(meth) acrylamide, N-butoxymethyl(meth)acrylamide and N-hydroxyethyl acrylamide; amino group-containing monomers such as aminoethyl(meth)acrylate, dimethylaminoethyl (meth)acrylate and t-butyl aminoethyl(meth)acrylate; glycydyl group-containing monomers such as glycidyl(meth) acrylate and methylglycidyl(meth)acrylate; cyano group-containing monomers such as acrylonitrile and methacrylonitrile; heterocyclic ring-containing vinyl monomers such as N-vinyl pyridine, N-vinyl piperidone, N-vinyl pyrimidine, N-vinyl piperazine, N-vinyl pyrrole, N-vinyl imidazole and N-vinyl oxazole in addition to N-vinyl-2-pyrrolidone and (meth)acryloyl morpholine; sulfonate group-containing monomers such as sodium vinyl sulfonate; phosphate group-containing monomers such as 2-hydroxyethyl acryloyl phosphate; imide group-containing monomers such as cyclohexyl maleimide and isopropyl maleimide; and isocyanate group-containing monomers such as 2-methacryloyloxyethyl isocyanate. The polar group-containing monomers are used either alone or in combination of two or more thereof.

Among the examples thereof, as the polar group-containing monomer, a hydroxyl group-containing monomer is preferable, and a hydroxyl group-containing monomer such as 2-hydroxyethyl(meth)acrylate, and 4-hydroxybutyl (meth)acrylate is more preferable from the standpoint of obtaining a desired adhesion property and increasing a relative dielectric constant in the pressure-sensitive adhesive sheet.

In the pressure-sensitive adhesive layer of the pressure-sensitive adhesive sheet, if carboxyl group-containing monomers such as acrylic acid or anhydrides thereof are used as the monomer component forming the acrylic polymer as the base polymer, the relative dielectric constant of the pressure-sensitive adhesive sheet may be decreased.

In the case where the optical pressure-sensitive adhesive layer according to the present invention has the acrylic pressure-sensitive adhesive layer, it is preferable that the acrylic polymer of the acrylic pressure-sensitive adhesive layer does not substantially contain a carboxyl group-containing monomer (particularly, acrylic acid), as a monomer component forming the polymer. The wording "does not substantially contain a carboxyl group-containing monomer (particularly, acrylic acid)" means that the carboxyl group-containing monomer is contained in an amount of less than 1 wt % (preferably less than 0.1 wt %) based on the total amount (100 wt %) of the monomer component forming the acrylic polymer.

The content of the polar group-containing monomer is not particularly limited, but is preferably 5 wt % to 50 wt %, and more preferably 10 wt % to 40 wt % based on the total monomer components forming the acrylic polymer (100 wt %).

Particularly, the content of the hydroxyl group-containing monomer such as 2-hydroxyethyl(meth)acrylate, and 4-hydroxybutyl(meth)acrylate is preferably 5 wt % to 50 wt %, and more preferably 10 wt % to 40 wt % based on the total amount of the monomer components forming the acrylic polymer (100 wt %). If the content of the hydroxyl group-containing monomer is more than 50 wt %, the pressure-sensitive adhesive layer becomes hard, and there may be a problem in that the adhesion property of the pressure-sensitive adhesive sheet is decreased. Meanwhile, if the content of the hydroxyl group-containing monomer is less than 5 wt %, there may be a problem in that the pressure-sensitive adhesive layer undergoes white turbidity upon humidification.

The multifunctional monomers is not particularly limited, and examples thereof include hexandiol di(meth)acrylate, butanediol di(meth)acrylate, (poly)ethylene glycol di(meth) acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, vinyl (meth)acrylate, divinyl benzene, epoxy acrylate, polyester acrylate and urethane acrylate. The multifunctional monomers are used either alone or in combination of two or more thereof.

In the total monomer component forming the acrylic polymer, the content of the multifunctional monomer is not particularly limited, but is preferably 5 wt % or less (e.g., 0.01 wt % to 5 wt %), and more preferably 1 wt % or less (e.g., 0.01 wt % to 1 wt %) based on the total amount of the monomer component forming the acrylic polymer (100 wt %). If the contents of the multifunctional monomers are excessively high, cohesion force of the pressure-sensitive adhesive layer may be excessively increased and the stress relaxation properties may be lowered.

As the copolymerizable monomers other than the polar group-containing monomers and multifunctional monomers as described above (other copolymerizable monomers), examples thereof include: alkyl ester(meth)acrylate having a cyclic alkyl group such as cyclopentyl(meth)acrylate, cyclohexyl(meth)acrylate and isobornyl(meth)acrylate; ester (meth)acrylate other than the above-mentioned alkyl ester (meth)acrylate such as ester(meth)acrylate having aromatic hydrocarbon groups such as phenyl(meth)acrylate, polar group-containing monomers and polyfunctional monomers; vinyl esters such as vinyl acetate and vinyl propionate;

aromatic vinyl compounds such as styrene and vinyl toluene; olefins or dienes such as ethylene, butadiene, isoprene, and isobutylene; vinyl ethers such as vinyl alkyl ether; and vinyl chloride.

Among the examples thereof, alkyl ester(meth)acrylate having a cyclic alkyl group and ester(meth)acrylate having an aromatic hydrocarbon group are preferable as the other copolymerizable monomer from the standpoint of controlling elastic modulus of the pressure-sensitive adhesive.

Particularly, in the acrylic polymer, the content of the sum of the alkyl ester(meth)acrylate having a cyclic alkyl group and the ester(meth)acrylate having an aromatic hydrocarbon group in the total monomer component forming the acrylic polymer (100 wt %) is not particularly limited, but is preferably 5 wt % to 50 wt %, and more preferably 10 wt % to 40 wt %. If the content is more than 50 wt %, the pressure-sensitive adhesive layer becomes hard, and there may be a problem in that the adhesion property of the pressure-sensitive adhesive sheet is decreased. Meanwhile, if the content is less than 5 wt %, (i) a trace appears in the case where pressure is applied to the pressure-sensitive adhesive layer. (ii) If pressure is applied to a portion of the surface of the pressure-sensitive adhesive layer, there may be a problem in that the portion to which the pressure is applied is recessed, and then, the recessed portion is not recovered.

From the standpoint that the adhesion force to glass and the relative dielectric constant of the pressure-sensitive adhesive sheet are adjusted in a predetermined range, preferable embodiments of the monomer components forming the acrylic polymer may include the following (a) to (c).

Embodiment (a)

Alkoxyalkyl ester(meth)acrylate is used as the monomer component forming the acrylic polymer, and the content of alkoxyalkyl ester(meth)acrylate based on the total monomer component forming the acrylic polymer (100 wt %) is 40 wt % or more (e.g., 40 wt % to 80 wt %), and preferably 50 wt % or more (e.g., 50 wt % to 70 wt %).

Embodiment (b)

Alkyl ester (meth)acrylate having a straight-chain or branched alkyl group and at least one copolymerizable monomer selected from the group consisting of alkyl ester (meth)acrylate having a cyclic alkyl group, ester (meth)acrylate having an aromatic hydrocarbon group and hydroxyl group-containing monomer is used as the monomer component forming the acrylic polymer, and the content of the copolymerizable monomer based on the total monomer component forming the acrylic polymer (100 wt %) is 10 to 60 wt % (preferably 20 wt % to 40 wt %).

In the embodiment (b), the embodiment using alkoxyalkyl ester(meth)acrylate as the monomer component forming the acrylic polymer is not included.

Embodiment (c)

Alkoxyalkyl ester(meth)acrylate and hydroxyl group-containing monomer are used as the monomer component forming the acrylic polymer, and the content of alkoxyalkyl ester(meth)acrylate based on the total monomer component forming the acrylic polymer (100 wt %) is 40 wt % or more (e.g., 40 wt % to 80 wt %), and preferably 50 wt % or more (e.g., 50 to 70 wt %), and the content of the hydroxyl group-containing monomer based on the total monomer component forming the acrylic polymer (100 wt %) is 0.5 wt % to 50 wt % (preferably 1 wt % to 40 wt %).

The acrylic polymer is formed by polymerizing the above monomer components by a known/general polymerization method. Examples of the polymerization method include a solution polymerization method, an emulsion polymerization method, a bulk polymerization method and a polymerization method by active-energy-ray irradiation (an active-energy-ray polymerization method or a photopolymerization method). Among the above polymerization method, the solution polymerization method and active-energy-ray polymerization method are preferable from the standpoint of transparency, water resistance and costs, and particularly when a relatively thick pressure-sensitive adhesive layer is formed, an active-energy-ray polymerization method is preferable.

The active energy rays irradiated during the active-energy-ray polymerization are not particularly limited, and examples thereof include ultraviolet rays, or ionizing radiations such as an α-ray, a β-ray, a γ-ray, a neutron ray, and an electron ray. Among them, the ultraviolet rays are preferable as active energy rays. Irradiation energy, irradiation time and irradiation method of active energy rays used during the active-energy-ray polymerization are not particularly limited as far as photopolymerization initiators as described below can be activated to cause the reaction of monomer components.

The solvent used in the solution polymerization is not particularly limited, and various general solvents are used. Examples of the solvents include organic solvents such as esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; ketones such as methyl ethyl ketone and methyl isobutyl ketone. Such solvents are used either alone or in combination of two or more thereof.

Polymerization initiators such as a photopolymerization initiator or a thermal polymerization initiator are used depending on the type of polymerization reaction in the formation of the acrylic polymer. The polymerization initiators are used either alone or in combination of two or more thereof.

The photopolymerization initiator is not particularly limited, and examples thereof include a benzoin ether-based photopolymerization initiator, an acetophenon-based photopolymerization initiator, an α-ketol-based photopolymerization initiator, an aromatic sulfonylchloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator and a thioxanthone-based photopolymerization initiator.

Examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethane-1-one and anisole methyl ether. Examples of the acetophenone-based photopolymerization initiator include 2,2-diethoxyacetophenone, 2,2-dimethoxy-2-phenylacetophenone, 1-hydroxycyclohexylphenylketone, 4-phenoxydichloroacetophenone and 4-(t-butyl)dichloroacetophenone. Examples of the α-ketol based photopolymerization initiator include 2-methyl-2-hydroxypropiophenone and 1-[4-(2-hydroxyethyl)phenyl]-2-methylpropane-1-one. Examples of the aromatic sulfonyl chloride-based photopolymerization initiator include 2-naphthalenesulfonyl chloride. Examples of the photoactive oxime-based photopolymerization initiator include 1-phenyl-1,1-propandion-2-(o-ethoxycarbonyl)-oxime. Examples of the benzoin-based photopolymerization initiator include benzoin. Examples of the benzyl-based photopolymerization initiator include benzyl. Examples of the benzophenone-based photopolymerization initiator include benzophenone, benzoyl benzoate, 3,3'-dimethyl-4-methoxybenzophenone, polyvinyl benzophenone and α-hydroxycyclohexyl phenylketone. Examples of the ketal-based photopolymerization initiator include benzyl dimethyl ketal. Examples of the thioxanthone-based photopolymerization initiator include thioxanthone, 2-chlorothioxanthone, 2-methyl thioxanthone, 2,4-dimethyl thioxanthone, isopropyl thioxanthone, 2,4-diisopropyl thioxanthone and dodecyl thioxanthone. The photopolymerization initiators are used either alone or in combination of two or more thereof.

The amount of the photopolymerization initiator used (particularly, the content of the photopolymerization initiator in the acrylic pressure-sensitive adhesive composition) is not particularly limited, but it is preferably 0.005 to 1 part by weight and more preferably 0.01 to 0.5 part by weight based on 100 parts by weight of monomer components forming an acrylic polymer.

The thermal polymerization initiator is not particularly limited, and examples thereof include azo-based polymerization initiators, peroxide-based polymerization initiators and redox-based polymerization initiators. Examples of the azo-based polymerization initiators include 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropan)dihydrochloride, 2,2'-azobis[2-(5-methyl-2-imidazolin-2-yl)propane]dihydrochloride, 2,2'-azobis(2-methylpropionamidine)disulfate and 2,2'-azobis(N,N'-dimethyleneisobutylamidine)dihydrochloride. Examples of the peroxide-based polymerization initiators include dibenzoyl peroxide and tert-butyl permaleate. The thermal polymerization initiators are used either alone or in combination of two or more thereof. The amount of the thermal polymerization initiator used is not particularly limited, and a known range that can be used as a thermal polymerization initiator may be used.

In the pressure-sensitive adhesive layer of the optical pressure-sensitive adhesive sheet according to the present invention, additives may be used as necessary within the amount ranges in which characteristics of the present invention are not impaired. Examples of the additives include crosslinking agents, crosslinking accelerators, silane coupling agents, tackifiers (e.g., rosin derivative resin, polyterpene resin, petroleum resin and oil soluble phenolic resin), anti-aging agents, fillers, coloring agents (e.g., pigments and dyes), ultraviolet absorbers, antioxidants, chain transfer agents, plasticizers, softeners, surfactants and antistatic agents. The additives are used either alone or in combination of two or more thereof.

Particularly, in the pressure-sensitive adhesive layer of the optical pressure-sensitive adhesive sheet according to the present invention, a silane coupling agent may be contained from the standpoint of improving the adhesion property to optical members, particularly to glass. The wording "the silane coupling agent is contained" includes a case where the silane coupling agent is contained in the base polymer in the pressure-sensitive adhesive layer as a constitutional unit as well as a case where the silane coupling agent is contained in the pressure-sensitive adhesive layer. The silane coupling agents are used either alone or in combination of two or more thereof.

Namely, the optical pressure-sensitive adhesive sheet according to the present invention may have the acrylic pressure-sensitive adhesive layer containing the silane coupling agent.

The silane coupling agent is not particularly limited, and examples thereof include γ-glycidoxypropyltrimethoxysilane, γ-glycidoxypropyltriethoxysilane, γ-aminopropyltrimethoxysilane and N-phenyl-aminopropyltrimethoxysilane. Among them, γ-glycidoxypropyltrimethoxysilane is preferable as the silane coupling agent. Examples of the silane coupling agent may include commercially available products such as trade name "KBM-403" (manufactured by Shin-Etsu Chemical Co., Ltd.).

The content of the silane coupling agent in the pressure-sensitive adhesive layer of the optical pressure-sensitive adhesive sheet according to the present invention is not particularly limited. For example, in the case where the pressure-sensitive adhesive layer of the optical pressure-sensitive adhesive sheet according to the present invention is the acrylic pressure-sensitive adhesive layer, the content of the silane coupling agent in the acrylic pressure-sensitive adhesive layer is preferably 0.01 to 2 parts by weight, and more preferably 0.05 to 0.8 parts by weight based on 100 parts by weight of the monomer component forming the acrylic polymer.

In the pressure-sensitive adhesive layer of the optical pressure-sensitive adhesive sheet according to the present invention, a crosslinking agent is preferably used from the standpoint of improving the adhesion property by increasing cohesion force of the pressure-sensitive adhesive layer. The crosslinking agents are used either alone or in combination of two or more thereof.

Namely, it is preferable that the optical pressure-sensitive adhesive sheet according to the present invention has an acrylic pressure-sensitive adhesive layer in which the crosslinking agent is used. For example, it is preferable that the optical pressure-sensitive adhesive sheet according to the present invention has the acrylic pressure-sensitive adhesive layer formed from the acrylic pressure-sensitive adhesive composition containing the crosslinking agent. This is because that if the acrylic polymer is crosslinked by the crosslinking agent, cohesion force of the pressure-sensitive adhesive layer may be increased even more.

The crosslinking agent is not particularly limited, and for example, in the case of the pressure-sensitive adhesive sheet having the acrylic pressure-sensitive adhesive layer, it is preferable to use isocyanate-based crosslinking agents or epoxy-based crosslinking agents from the standpoint of improving the adhesion property to optical members.

The isocyanate-based crosslinking agents is not particularly limited, and examples thereof include lower aliphatic polyisocyanates such as 1,2-ethylene diisocyanate, 1,4-butylene diisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate and hydrogenated xylene diisocyanate; and aromatic polyisocyanates such as 2,4-tolylene diisocyanate, 2,6-tolylene diisocyanate, 4,4'-diphenylmethane diisocyanate and xylene diisocyanate. In addition, examples thereof include an adduct of trimethylolpropane/tolylene diisocyanate (trade name of 'Coronate L', manufactured by Nippon Polyurethane Industry Co., Ltd.); and an adduct of trimethylolpropane/hexamethylene diisocyanate (trade name of 'Coronate HL', manufactured by Nippon Polyurethane Industry Co., Ltd.).

Examples of the epoxy-based crosslinking agents include epoxy-based resins having two or more epoxy groups in molecules thereof such as N,N,N',N'-tetraglycidyl-m-xylenediamine, diglycidylaniline, 1,3-bis(N,N-diglycidylaminomethyl)cyclohexane, 1,6-hexandioldiglycidylether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylol propane polyglycidyl ether, adipic acid diglycidyl ester, o-phthalic acid diglycidyl ester, triglycidyl-tris(2-hydroxyethyl)isocyanurate, resorsin type diglycidyl ether and bisphenol-S-diglycidylether. As commercially available products thereof, examples thereof include a trade name of 'Tetrad-C' manufactured by Mitsubishi Gas Chemical Company Inc.

The content of the crosslinking agent in the pressure-sensitive adhesive layer of the optical pressure-sensitive adhesive sheet according to the present invention is not particularly limited. For example, in the case of the pressure-sensitive adhesive sheet having the acrylic pressure-sensitive adhesive layer, the content of the crosslinking agent used in the acrylic pressure-sensitive adhesive layer is not particularly limited, but preferably 0.001 to 20 parts by weight, and more preferably 0.01 to 10 parts by weight based on 100 parts by weight of the monomer component forming the acrylic polymer.

The thickness of the pressure-sensitive adhesive of the optical pressure-sensitive adhesive sheet according to the present invention is not particularly limited, but is preferably 10 μm to 500 μM, and more preferably 10 μm to 250 μm. The pressure-sensitive adhesive may be a single layer structure or a laminate structure.

From the standpoint of increasing the adhesion force to glass to a predetermined range, the crosslinking agent and/or silane coupling agent may be used in the pressure-sensitive adhesive layer (particularly acrylic pressure-sensitive adhesive layer) of the optical pressure-sensitive adhesive sheet according to the present invention. Particularly, in the case where the pressure-sensitive adhesive layer of the pressure-sensitive adhesive sheet according to the present invention is the acrylic pressure-sensitive adhesive layer, the crosslinking agent such as the epoxy-based crosslinking agent or isocyanate-based crosslinking agent and/or silane coupling agent may be used in the acrylic pressure-sensitive adhesive layer. For example, the pressure-sensitive adhesive sheet according to the present invention may have the acrylic pressure-sensitive adhesive layer formed from the acrylic pressure-sensitive adhesive composition containing the crosslinking agent and/or silane coupling agent.

(Substrate)

In the case where the optical pressure-sensitive adhesive sheet according to the present invention is a pressure-sensitive adhesive sheet with substrate, the substrate is not particularly limited, and examples of the substrate include various kinds of optical films such as a plastic film, an anti-reflective (AR) film, a polarizer and a retardation film. Examples of materials of the plastic film include plastics materials such as polyester-based resins such as polyethylene terephthalate (PET), acrylic resins such as polymethylmethacrylate (PMMA), polycarbanate, triacetylcelluous, polysulfone, polyarylate and cyclic olefin based polymers such as cyclic olefin based polymer with trade name of 'ARTON' manufactured by JSR Corporation and cyclic olefin based polymer with trade name of 'ZEONOR' manufactured by ZEON Corporation. The plastic materials are used either alone or in combination of two or more thereof. The 'substrate' is a portion laminated to an adherend together with the pressure-sensitive adhesive layer, when the optical pressure-sensitive adhesive sheet is used (laminated) to the adherend (optical member). The release liner (separator) to be described below which is released in the use (lamination) of the optical pressure-sensitive adhesive sheet is not included in the 'substrate'.

As the substrate, among them, a transparent substrate is preferable from the standpoint of achieving high transparency in the pressure-sensitive adhesive sheet. The 'transparent substrate' is preferably a substrate having a total light transmittance of 85% or more in a visible light wavelength range in accordance with JIS K 7361, and more preferably a substrate having a total light transmittance of 90% or more. Examples of the transparent substrate include a PET film, and non-oriented films such as trade names of 'ARTON' and 'ZEONOR'.

A thickness of the substrate is not particularly limited, but is preferably 12 μm to 50 μm. The substrate may be formed in any forms of a single layer or plural layers. Proper known/general surface treatment such as corona discharge treatment, physical treatment such as plasma treatment, and chemical treatment such as base coating treatment may be performed on the surface of the substrate.

The substrate may be an optical member. That is, the optical pressure-sensitive adhesive sheet according to the present invention may be constituted by a substrate formed of an optical member and a pressure-sensitive adhesive layer.

(Release Liner)

The pressure-sensitive adhesive surfaces of the optical pressure-sensitive adhesive sheet according to the present invention may be protected by a release liner until they are used. The respective pressure-sensitive adhesive surfaces of the optical pressure-sensitive adhesive sheet may be protected by two release liners, respectively, or may be protected in a roll-shape wound form by a release liner of which both sides are formed as release faces. The release liner is used as protecting material of the pressure-sensitive adhesive layer, and is released when it is laminated to an adherend. In the case where the optical pressure-sensitive adhesive sheet according to the present invention is a substrateless double-sided pressure-sensitive adhesive sheet, the release liner also acts as a support of the pressure-sensitive adhesive layer. The release liner may be optionally provided.

Such a release liner is not particularly limited, and examples thereof include a general release paper, a substrate with a release-treated layer, a low adhesion substrate made of a fluorine-based polymer and a low adhesion substrate made of a non-polar polymer. Examples of the substrate with the release-treated layer include plastic films or papers of which surfaces are treated by release treating agents such as a silicone-based release treating agent, a long chain alkyl-based release treating agent, fluorine-based release treating agent, and molybdenum sulfate. Examples of the fluorine-based polymer of a low adhesion substrate made of a fluorine-based polymer include polytetrafluoroethylene, polychlorotrifluoroethylene, polyvinyl fluoride, polyvinylidene fluoride, tetrafluoroethylene-hexafluoropropylene copolymer and chlorofluoroethylene-vinylidene fluoride copolymer. Examples of the non-polar polymer of a low adhesion substrate made of a non-polar polymer include olefin-based resins such as polyethylene and polypropylene.

The release liner may be formed by know/general methods. The thickness of the release liner are not particularly limited.

(Optical Pressure-Sensitive Adhesive Sheet)

A method for manufacturing the optical pressure-sensitive adhesive sheet according to the present invention is not particularly limited, but known/general methods are used. For example, the substrateless type pressure-sensitive adhesive sheet is manufactured by forming the pressure-sensitive adhesive layer on a release-treated layer of the release liner, and the pressure-sensitive adhesive sheet with the substrate is manufactured by forming the pressure-sensitive adhesive layer on the substrate or transferring the separately formed pressure-sensitive adhesive layer on the substrate.

A method for forming a pressure-sensitive adhesive layer when the optical pressure-sensitive adhesive sheet according to the present invention is formed is not particularly limited, and the pressure-sensitive adhesive layer may be formed by known/general methods for forming pressure-sensitive adhesive layer. The methods for forming the pressure-sensitive adhesive layer vary depending on polymerization methods of a base polymer, and examples thereof may include the following methods.

(1) A pressure-sensitive adhesive layer is formed by coating on a substrate or release liner a composition (a pressure-sensitive adhesive composition or active-energy-ray curable pressure-sensitive adhesive composition) containing a mixture of monomer components (monomer mixture) forming a base polymer or a partially polymerized product thereof, and additives such as a photopolymerization initiator added as necessary, and irradiating active energy rays thereon.

(2) A pressure-sensitive adhesive layer is formed by coating on a substrate or release liner a composition (a pressure-sensitive adhesive composition or solvent type pressure-sensitive adhesive composition) containing a base polymer, solvent and additives added as necessary, and drying and/or curing the composition.

Heating and drying steps may be performed in methods (1) and (2) if necessary. The 'monomer mixture' means a mixture consisting of monomer components forming a base polymer. The 'partially polymerized product thereof' means a composition in which one or more of the components in the monomer mixture are partially polymerized.

In the methods for forming the pressure-sensitive adhesive layer, coating of the pressure-sensitive adhesive composition may be performed by using any known coating methods. For example, the pressure-sensitive adhesive composition may be coated on the substrate or release liner by using coaters such as a gravure roll coater, a reverse roll coater, a kiss roll coater, a dip roll coater, a bar coater, a knife coater, a spray coater, a comma coater and a direct coater.

In the present invention, for example, the optical pressure-sensitive adhesive sheet (optical acrylic pressure-sensitive adhesive sheet) having the acrylic pressure-sensitive adhesive layer is manufactured by the following manufacturing method 1 or manufacturing method 2.

Manufacturing method 1: Manufacturing method for obtaining a pressure-sensitive adhesive sheet, including forming a pressure-sensitive adhesive composition layer by coating on a predetermined surface of a release liner a pressure-sensitive adhesive composition containing a mixture of monomer components forming an acrylic polymer (acrylic monomer mixture) or a partially polymerized product thereof and a photopolymerization initiator, and then curing the pressure-sensitive adhesive composition layer by an active-energy-ray irradiation to form an acrylic pressure-sensitive adhesive layer.

Manufacturing method 2: Manufacturing method for obtaining a pressure-sensitive adhesive sheet, including coating a pressure-sensitive adhesive composition containing an acrylic polymer and solvent on a predetermined surface of a release liner to form a pressure-sensitive adhesive composition layer, and then, drying and/or curing the pressure-sensitive adhesive composition to form an acrylic pressure-sensitive adhesive layer.

From the standpoint of setting the adhesion force to glass and relative dielectric constant of the pressure-sensitive adhesive sheet within a predetermined range, it is preferable that the monomer component forming the acrylic polymer as described in the above embodiments (a) to (c), which are preferable embodiments of the monomer component forming the acrylic polymer, are preferably used in preparing the acrylic pressure-sensitive adhesive composition of manufacturing method 1 and manufacturing method 2.

The thickness of the optical pressure-sensitive adhesive sheet according to the present invention is not particularly limited, but is preferably 10 μm to 500 μm, and more preferably 10 μm to 250 μm.

Since the optical pressure-sensitive adhesive sheet according to the present invention has the adhesion force to glass within a predetermined range, the excellent adhesion property to the optical member is exhibited, and particularly, the excellent adhesion property to optical members made of glass is exhibited. Since the optical pressure-sensitive adhesive sheet according to the present invention has a relative dielectric constant at a frequency of 1 MHz within a predetermined range, functions or characteristics of the optical members are not damaged when the optical pressure-sensitive adhesive sheet is applied to the optical members. Particularly, the optical pressure-sensitive adhesive sheet according to the present invention exhibits an excellent adhesion property to the members constituting the touch panel and the performances such as a detection sensitivity or response speed of the touch panel are not negatively affected, when used for laminating members constituting the electric capacity type touch panel.

The optical members refer to members having optical properties such as a polarized property, a photorefractivity property, a light scattering property, a light reflective property, a light transmitting property, a light absorbing property, a light diffractive property, an optical rotation property and visibility. Although the optical members are not particularly limited as far as they are members having optical properties, examples thereof include members constituting devices (optical devices) such as display devices (image display devices) and input devices, or members used in the devices. Examples of the optical members include a polarizing plate, a wave plate, a retardation plate, an optical compensation film, a brightness enhancing film, a light guide plate, a reflective film, an anti-reflective film, a transparent conductive film (ITO film), a design film, a decoration film, a surface protection film, a prism, lens, a color filter, a transparent substrate, and members in which these are laminated. The 'plate' and 'film' include plate form, film form and sheet form, and examples of the 'polarizing plate' include 'a polarizing film' and 'a polarizing sheet'.

Examples of the display devices include a liquid crystal display, an organic electroluminescence (EL) display device, a Plasma Display Panel (PDP) and an electronic paper. Examples of the input devices include touch panels, particularly, such as an electric capacity type touch panel.

The optical pressure-sensitive adhesive sheet according to the present invention is preferably used for the purpose of laminating members constituting the electric capacity type touch panel.

The optical members are not particularly limited, and examples thereof include members (e.g., a sheet, film or plate type of members) formed of an acrylic resin, polycarbonate, polyethylene terephthalate, glass and metal films. The 'optical members' in the present invention may include members paying a role of decoration or protection while maintaining visibility of a display device or input device that is an adherent as described above (a design film, a decorating film and a surface protection film).

Although embodiments of laminating optical members by the optical pressure-sensitive adhesive sheet according to the present invention are not particularly limited, they may include (1) an embodiment of interposing the pressure-sensitive adhesive sheet between the optical members to laminate the optical members to each other, (2) an embodiment of laminating an optical member to any members other than the optical member through the pressure-sensitive adhesive sheet, and (3) an embodiment of laminating the pressure-sensitive adhesive sheet including the optical member to optical members or any members other than the optical members. In the above embodiment (3), it is preferable that the pressure-sensitive adhesive sheet is a pressure-sensitive adhesive sheet with substrate using an optical member such as a polarizing film and an optical film as a substrate.

A pressure-sensitive adhesive type optical member having the pressure-sensitive adhesive layer on at least one surface of the optical member may be obtained by adhering and laminating the optical pressure-sensitive adhesive sheet (particularly, substrateless type) according to the present invention on the surface (at least one surface) of the optical member.

As a more specific example, the FIGURE shows a schematic view illustrating an embodiment of an electric capacity type touch panel formed by laminating members using an optical pressure-sensitive adhesive sheet according to the present invention. In the FIGURE, reference numeral 1 represents an electric capacity type touch panel, reference numeral 11 represents a transparent protective lens, reference numeral 12 represents an optical pressure-sensitive adhesive sheet, reference numeral 13a represents an ITO glass substrate, reference numeral 13b represents an ITO film (transparent conductive film), and reference numeral 14 represents a liquid crystal display. In the electric capacity type touch panel 1, the "transparent protective lens 11" and the "ITO glass substrate 13a, on both sides of which the ITO films 13b are coated" are laminated through the optical pressure-sensitive adhesive sheet 12, and the "ITO glass substrate 13a, on both sides of which the ITO films 13b are coated" and the "liquid crystal display 14" are laminated through the optical pressure-sensitive adhesive sheet 12. In the electric capacity type touch panel 1, one in which the ITO film 13b is coated on both surfaces of the ITO glass substrate 13a is used, but in general, in the electric capacity type touch panel, one in which the ITO film is coated on one surface of the ITO glass substrate may be used. It is preferable that the transparent protective lens 11 is a transparent protective lens made of glass or plastic. It is also preferable that the surface layer of the liquid crystal display 14 is a glass layer or a plastic film layer.

In the electric capacity type touch panel in which the optical pressure-sensitive adhesive sheet according to the present invention is used, such as the electric capacity type touch panel 1, the pressure-sensitive adhesive sheet has excellent adhesion property to the members constituting the touch panel, particularly to the members of which the surface is made of glass. Accordingly, releasing does not occur between the members during using the touch panel. Further, in the electric capacity type touch panel in which the pressure-sensitive adhesive sheet according to the present invention is used, the relative dielectric constant of the pressure-sensitive adhesive sheet at a frequency of 1 MHz is in a predetermined range. Therefore, the detection sensitivity or response speed is excellent, and noise is difficult to be detected. Accordingly, the electric capacity type touch panel in which the optical pressure-sensitive adhesive sheet according to the present invention is used has an excellent operation stability. In the electric capacity type touch panel in which the pressure-sensitive adhesive sheet according to the present invention is used, the visibility is also excellent if the transparency of the pressure-sensitive adhesive sheet is high.

(Optical Device)

By using the optical pressure-sensitive adhesive sheet when laminating members constituting optical devices or members used in the devices, the optical device in which the optical pressure-sensitive adhesive sheet is used may be obtained.

Examples of the optical device include a display device (image display device) such as a liquid crystal display device, an organic EL display device, a PDP, and an electronic paper, and an input device such as a touch panel (particularly, electric capacity type touch panel).

Since the optical pressure-sensitive adhesive sheet is used in the optical device, the detection sensitivity or response speed is good, noise is difficult to be detected, and the operation stability is excellent. If the transparency of the pressure-sensitive adhesive sheet is high, the visibility is also excellent.

EXAMPLES

Hereinafter, the present invention will be described in more detail with reference to the following Examples, but the present invention is not limited to the following Examples.

Example 1

55 parts by weight of methoxyethyl acrylate (MEA), 12 parts by weight of ethylacrylate (EA), 15 parts by weight of methylmeth acrylate (MMA), 18 parts by weight of 4-hydroxybutyl acrylate (4HBA), 0.3 parts by weight of azobisisobutyronitrile and 233.8 parts by weight of ethyl acetate as a polymerization solvent were placed into a separable flask, followed by agitating for 1 hour while introducing nitrogen gas thereinto. Then, oxygen was removed from the polymerization system, and the polymerization system was heated to 63° C., followed by reacting for 10 hours to obtain an acrylic polymer solution having a solid concentration of 30 wt %. The acrylic polymer in the acrylic polymer solution had a weight average molecule weight of 1,100,000.

Based on 100 parts by weight (in solid matter equivalent) of the acrylic polymer solution, the isocyanate-based cross-linking agent (manufactured by NIPPON POLYURETHANE INDUSTRY CO., LTD., trade name "CORONATE L") was mixed in the ratio of 0.7 parts by weight (in solid matter equivalent), followed by controlling the viscosity with toluene to obtain the pressure-sensitive adhesive composition solution (solid concentration: 27 wt %, viscosity: 1.5 Pa·s).

This solution was coated on the release-treated surface of the release liner (release liner in which one side of the polyethyleneterephthalate film was release-treated, thickness of 38 μm, trade name "MRF38", manufactured by Mitsubishi Plastics Inc.) to form a coat layer, and the coat layer was heated and dried at 60° C. for 30 sec and at 150° C. for 1 min, followed by further aging at 23° C. for 120 hours to prepare a pressure-sensitive adhesive sheet (substrateless type, the thickness of the pressure-sensitive adhesive layer: 50 μm).

The same release liner was provided on the pressure-sensitive adhesive surface opposite to the pressure-sensitive adhesive surface on which the release liner was provided.

Example 2

67 parts by weight of butyl acrylate (BA), 14 parts by weight of cyclohexyl acrylate (CHA), 27 parts by weight of 4-hydroxybutyl acrylate (4HBA), 9 parts by weight of hydroxyethyl acrylate (HEA), 0.05 parts by weight of 2,2-dimethoxy-1,2-diphenyl-1-one (trade name "IRGACURE 651", manufactured by BASF Japan Co., Ltd.) and 0.05 parts by weight of 1-hydroxy-cyclohexyl-phenyl-ketone (trade name "IRGACURE 184", manufactured by BASF Japan Co., Ltd.) were placed into a four-neck flask, and the mixture was partially photopolymerized by exposing to UV under the nitrogen atmosphere to obtain a partially polymerized product (monomer syrup) having the polymerization ratio of 10%.

0.1 parts by weight (in solid matter equivalent) of isocyanate compound (trade name "CORONATE L", manufactured by NIPPON POLYURETHANE INDUSTRY CO., LTD., solid concentration: 75 wt %) was added to 100 parts by weight of the partially polymerized product, and then, they were uniformly mixed to prepare a photopolymerizable composition.

This photopolymerizable composition was coated on the release-treated surface of the release liner (release liner in which one side of the polyethylene terephthalate film was release-treated, thickness of 38 μm, trade name "MRF38", manufactured by Mitsubishi Plastics Inc.) to form a coat layer, and then, the same release liner was provided on the coat layer.

Next, the pressure-sensitive adhesive sheet (substrateless type, the thickness of the pressure-sensitive adhesive layer: 175 μm) was prepared by irradiating UV having the intensity of 5 mW/cm$^2$ by the black light and performing polymerization until the light intensity of 3600 mJ/cm$^2$ was irradiated thereon.

The weight average molecule weight of the acrylic polymer as the base polymer of the pressure-sensitive adhesive layer was 2,000,000.

Example 3

The pressure-sensitive adhesive sheet was prepared in the same manner as in Example 1, except that the monomer components were 66 parts by weight of methoxyethyl acrylate (MEA), 1 parts by weight of 4-hydroxybutyl acrylate (4HBA), 23 parts by weight of ethyl acrylate (EA) and 10 parts by weight of methyl methacrylate (MMA). Similar to Example 1, the release liner was provided on the adhesion surface opposite to the pressure-sensitive adhesive surface on which the release liner was provided.

The acrylic polymer in the acrylic polymer solution had a weight average molecule weight of 1,000,000.

Example 4

The pressure-sensitive adhesive sheet was prepared in the same manner as in Example 1, except that the monomer components were 59 parts by weight of methoxyethyl acrylate (MEA), 40 parts by weight of 2-ethylhexyl acrylate (2EHA) and 1 part by weight of 4-hydroxybutyl acrylate (4HBA). Similar to Example 1, the release liner was provided on the pressure-sensitive adhesive surface opposite to the pressure-sensitive adhesive surface on which the release liner was provided.

The acrylic polymer in the acrylic polymer solution had a weight average molecule weight of 1,000,000.

Comparative Example 1

The pressure-sensitive adhesive sheet was prepared in the same manner as in Example 2, except that the monomer components were 88 parts by weight of isooctyl acrylate (iOA) and 12 parts by weight of acrylic acid (AA).

The weight average molecule weight of the acrylic polymer as the base polymer of the pressure-sensitive adhesive layer was 1,000,000.

Comparative Example 2

The pressure-sensitive adhesive sheet was prepared in the same manner as in Example 2, except that the monomer components were 95 parts by weight of butyl acrylate (BA) and 5 parts by weight of acrylic acid (AA).

The weight average molecule weight of the acrylic polymer as the base polymer of the pressure-sensitive adhesive layer was 800,000.

Comparative Example 3

The pressure-sensitive adhesive sheet was prepared in the same manner as in Example 2, except that the monomer components were 99 parts by weight of butyl acrylate (BA) and 1 parts by weight of 4-hydroxybutyl acrylate (4HBA).

The weight average molecule weight of the acrylic polymer as the base polymer of the pressure-sensitive adhesive layer was 800,000.

(Evaluation)

The relative dielectric constant, adhesion strength to glass (adhesion force to glass), total light transmittance and haze were measured with respect to the pressure-sensitive adhesive sheet in the Examples and Comparative Examples. The measurement results were shown in Table 1.

(Relative Dielectric Constant)

The relative dielectric constant at the frequency of 1 MHz was measured under the following condition in accordance with JIS K 6911.

Measurement method: Volumetric method (device: Agilent Technologies 4294A Precision Impedance Analyzer was used)

Electrode constitution: Aluminum plate having a diameter of 12.1 mm and the thickness of 0.5 mm Counter electrode: 3 oz copper plate Measurement environment: 23±1° C., 52±1% RH (Adhesion Strength to Glass)

The specimen was prepared by cutting the pressure-sensitive adhesive sheet into the size of width 20 mm×length 100 mm, exposing the pressure-sensitive adhesive surface by releasing one release liner of the cut pressure-sensitive adhesive sheet, and laminating the PET film (backing material) having the thickness of 25 μm to the pressure-sensitive adhesive surface.

Then, the pressure-sensitive adhesive surface was exposed by releasing the release liner of the specimen, and the specimen in which the pressure-sensitive adhesive surface was exposed were laminated to a glass plate (slide glass, No. "S-1111", Matsunami Glass Industry Co., Ltd.) by pressing by moving a roller of 2 kg (width: about 50 mm) back and forth once. The specimen and glass plate were left standing for 30 min after laminating. The adherend surface of the glass plate was the surface from which fluorescence was not emitted even when UV having the wavelength of 254 nm was irradiated by a UV lamp.

Next, the release adhesion strength to glass (adhesion force to glass) (N/20 mm) was measured by releasing the specimen from the glass plate under the environment of 23° C. and 50% RH by using the tensile tester under the condition of the release angle of 180° and the tensile speed of 300 mm/min.

(Total Light Transmittance and Haze)

The pressure-sensitive adhesive surface was exposed by releasing one release liner of the pressure-sensitive adhesive sheet (the layer structure of the release liner/pressure-sensitive adhesive layer/release liner), and the pressure-sensitive adhesive sheet in which the pressure-sensitive adhesive surface was exposed was laminated to the glass plate (slide glass, No. "S-1111", Matsunami Glass Industry Co., Ltd.). The measurement sample having the layer structure of the glass plate/pressure-sensitive adhesive layer was prepared by releasing the other release liner.

With respect to the sample for measurement, the total light transmittance and haze were measured by the haze meter (device name 'HM-150' manufactured by Murakami Color Research Laboratory Co., Ltd.). The haze (%) was obtained by the equation of "diffusion transmittance/total light transmittance×100".

TABLE 1

| | Relative dielectric constant | Adhesion force to glass [N/20 mm] | Total light transmittance [%] | Haze [%] |
|---|---|---|---|---|
| Example 1 | 6.7 | 8 | 92 | 0.5 |
| Example 2 | 5.8 | 8 | 92 | 0.5 |
| Example 3 | 6.0 | 8 | 92 | 0.5 |
| Example 4 | 5.2 | 8 | 92 | 0.5 |
| Comparative Example 1 | 3.2 | 10 | 92 | 0.5 |
| Comparative Example 2 | 3.4 | 8 | 92 | 0.5 |
| Comparative Example 3 | 3.9 | 5 | 92 | 0.5 |

While the invention has been described in detail and with reference to specific embodiments thereof, it will be apparent to one skilled in the art that various changes and modifications can be made therein without departing from the spirit and scope thereof.

This application is based on Japanese Patent Application No. 2010-278847 filed on Dec. 15, 2010, and the entire subject matter of which is incorporated herein by reference.

The present invention provides the following optical pressure-sensitive adhesive sheet, liquid crystal display and input device.

(1) An optical pressure-sensitive adhesive sheet comprising a pressure-sensitive adhesive layer, wherein a relative dielectric constant at a frequency of 1 MHz is 5 to 10, and an adhesion strength to a glass, which is measured with a peel angle of 180° and a tensile speed of 300 mm/min after 30 min of laminating the optical pressure-sensitive adhesive sheet to the glass, is 3 N/20 mm to 15 N/20 mm.

(2) The optical pressure-sensitive adhesive sheet according to (1), wherein the pressure-sensitive adhesive layer comprises an acrylic pressure-sensitive adhesive layer.

(3) The optical pressure-sensitive adhesive sheet according to (2), wherein the acrylic pressure-sensitive adhesive layer comprises, as a base polymer, an acrylic polymer formed from a component comprising, as an essential monomer component, alkyl ester(meth)acrylate having a straight-chain or branched alkyl group having 1 to 14 carbon atoms and/or alkoxyalkyl ester(meth)acrylate.

(4) The optical pressure-sensitive adhesive sheet according to (3), wherein the acrylic polymer is formed by an active-energy-ray polymerization method with an irradiation of an active-energy-ray.

(5) The optical pressure-sensitive adhesive sheet according to any one of (1) to (4), wherein the pressure-sensitive adhesive layer comprises a silane coupling agent.

(6) The optical pressure-sensitive adhesive sheet according to any one of (1) to (5), which has a total light transmittance of 90% or more and a haze of 3.0% or less.

(7) The optical pressure-sensitive adhesive sheet according to any one of (1) to (6), which is used for laminating to a member contained in a touch panel.

(8) The optical pressure-sensitive adhesive sheet according to (7), wherein the touch panel is an electric capacity type touch panel.

(9) A liquid crystal display device comprising the optical pressure-sensitive adhesive sheet according to any one of (1) to (8).

(10) An input device comprising the optical pressure-sensitive adhesive sheet according to any one of (1) to (8).

DESCRIPTION OF REFERENCE NUMERALS AND SIGNS

1: Electric capacity type touch panel
11: Transparent protective lens
12: Optical pressure-sensitive adhesive sheet
13a: ITO glass substrate
13b: ITO film
14: Liquid crystal display

What is claimed is:

1. An optical pressure-sensitive adhesive sheet comprising a pressure-sensitive adhesive layer, wherein a relative dielectric constant at a frequency of 1 MHz is 5 to 10, and an adhesion strength to a glass, which is measured with a peel angle of 180° and a tensile speed of 300 mm/min after 30 min of laminating the optical pressure-sensitive adhesive sheet to the glass, is 5 N/20 mm to 15 N/20 mm, wherein the pressure-sensitive adhesive layer has a thickness of 50 to 500 μm, wherein the pressure-sensitive adhesive layer comprises an acrylic pressure-sensitive adhesive layer, and wherein the acrylic pressure-sensitive adhesive layer comprises, as a base polymer, an acrylic polymer formed from a component comprising, as monomer components, butyl acrylate, 4-hydroxybutyl acrylate, hydroxyethyl acrylate and cyclohexyl acrylate, and a content of acrylic acid is less than 1 wt % based on the total amount of the monomer components forming the acrylic polymer,
   wherein an alkoxyalkyl ester (meth)acrylate is not included as the monomer components, wherein the optical pressure-sensitive adhesive sheet has a total light transmittance of 90% or more and a haze of 3.0% or less, and the optical pressure-sensitive adhesive sheet is used for laminating to a member contained in a touch panel, wherein the optical pressure-sensitive adhesive sheet does not include a substrate layer, wherein the pressure-sensitive adhesive layer is double sided, having a pressure-sensitive adhesive property on top and bottom surfaces thereof, and wherein both the top and bottom pressure-sensitive adhesive surfaces have the adhesion strength to glass of 5 N/20 mm to 15 N/20 mm.

2. The optical pressure-sensitive adhesive sheet according to claim 1, wherein the acrylic polymer is formed by an active-energy-ray polymerization method with an irradiation of an active-energy-ray.

3. The optical pressure-sensitive adhesive sheet according to claim 2, wherein the pressure-sensitive adhesive layer comprises a silane coupling agent.

4. The optical pressure-sensitive adhesive sheet according to claim 1, wherein the pressure-sensitive adhesive layer comprises a silane coupling agent.

5. The optical pressure-sensitive adhesive sheet according to claim 1, wherein the touch panel is an electric capacity type touch panel.

6. A liquid crystal display device comprising the optical pressure-sensitive adhesive sheet according to claim 1.

7. An input device comprising the optical pressure-sensitive adhesive sheet according to claim 1.

8. An optical pressure-sensitive adhesive sheet comprising a pressure-sensitive adhesive layer, wherein a relative dielectric constant at a frequency of 1 MHz is 5 to 10, and an adhesion strength to a glass, which is measured with a peel angle of 180° and a tensile speed of 300 mm/min after 30 min of laminating the optical pressure-sensitive adhesive sheet to the glass, is 5 N/20 mm to 15 N/20 mm, wherein the pressure-sensitive adhesive layer has a thickness of 50 to 500 µm, wherein the pressure-sensitive adhesive layer comprises an acrylic pressure-sensitive adhesive layer, and wherein the acrylic pressure-sensitive adhesive layer comprises, as a base polymer, an acrylic polymer formed from a component comprising, as monomer components, butyl acrylate, 4-hydroxybutyl acrylate, hydroxyethyl acrylate and cyclohexyl acrylate, and a content of acrylic acid is less than 1 wt % based on the total amount of the monomer components forming the acrylic polymer, wherein an alkoxyalkyl ester (meth)acrylate is not included as the monomer components, wherein the acrylic polymer has a weight average molecular weight of 1,100,000 to 2,000,000, wherein the optical pressure-sensitive adhesive sheet has a total light transmittance of 90% or more and a haze of 3.0% or less, and the optical pressure-sensitive adhesive sheet is used for laminating to a member contained in a touch panel, wherein the optical pressure-sensitive adhesive sheet does not include a substrate layer, wherein the pressure-sensitive adhesive layer is double sided, having a pressure-sensitive adhesive property on top and bottom surfaces thereof, and wherein both the top and bottom pressure-sensitive adhesive surfaces have the adhesion strength to glass of 5 N/20 mm to 15 N/20 mm.

* * * * *